US011148553B2

(12) United States Patent
Jeong et al.

(10) Patent No.: US 11,148,553 B2
(45) Date of Patent: Oct. 19, 2021

(54) APPARATUS FOR CONTROLLING TEMPERATURE OF FUEL CELL AND METHOD THEREOF

(71) Applicants: HYUNDAI MOTOR COMPANY, Seoul (KR); KIA MOTORS CORPORATION, Seoul (KR)

(72) Inventors: Seong Cheol Jeong, Suwon-si (KR); Kyu Il Lee, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 914 days.

(21) Appl. No.: 15/611,000

(22) Filed: Jun. 1, 2017

(65) Prior Publication Data

US 2018/0170210 A1 Jun. 21, 2018

(30) Foreign Application Priority Data

Dec. 16, 2016 (KR) .................. 10-2016-0173035

(51) Int. Cl.
| | |
|---|---|
| *B60L 58/33* | (2019.01) |
| *H01M 8/04746* | (2016.01) |
| *H01M 8/0432* | (2016.01) |
| *H01M 8/04701* | (2016.01) |
| *H01M 8/04992* | (2016.01) |

(52) U.S. Cl.
CPC ......... *B60L 58/33* (2019.02); *H01M 8/04365* (2013.01); *H01M 8/04731* (2013.01); *H01M 8/04768* (2013.01); *H01M 8/04992* (2013.01); *B60L 2240/36* (2013.01); *B60L 2250/18* (2013.01); *H01M 2250/20* (2013.01); *Y02T 90/40* (2013.01)

(58) Field of Classification Search
CPC .............. B60L 58/33; H01M 8/04365; H01M 8/04731
See application file for complete search history.

(56) References Cited

U.S. PATENT DOCUMENTS

| | | | |
|---|---|---|---|
| 2014/0170515 A1* | 6/2014 | Na ................... | H01M 8/04067 429/434 |
| 2015/0288014 A1 | 10/2015 | Na et al. | |
| 2016/0164124 A1* | 6/2016 | Suh ................... | H01M 8/04798 429/411 |
| 2017/0008420 A1* | 1/2017 | Kim .................. | H01M 8/04723 |

FOREIGN PATENT DOCUMENTS

CN 103872354 A 6/2014

OTHER PUBLICATIONS

Office Action issued in corresponding Chinese Patent Application No. 2017104655078 dated May 26, 2021, with English translation.

* cited by examiner

*Primary Examiner* — Jonathan G Jelsma
(74) *Attorney, Agent, or Firm* — Morgan, Lewis & Bockius LLP

(57) ABSTRACT

A fuel cell temperature control apparatus includes: a driver propensity determination processor that determines a driver's propensity while a vehicle travels; a temperature control factor decision processor that determines a temperature control factor based on an ambient temperature and the driver's propensity to control the temperature of the fuel cell; and a storage that stores driver propensity determination information determined by the driver propensity determination processor.

16 Claims, 17 Drawing Sheets

APPARATUS FOR CONTROLLING TEMPERATURE OF FUEL CELL AND METHOD THEREOF

CROSS-REFERENCE TO RELATED APPLICATION

This application is based on and claims the benefit of priority to Korean Patent. Application No. 10-2016-0173035, filed on Dec. 16, 2016, in the Korean intellectual Property Office, the disclosure of which is incorporated herein in its entirety by reference.

TECHNICAL FIELD

The present disclosure relates to an apparatus for controlling a temperature of a fuel cell and a method thereof, and more particularly, relates to a technology for controlling a temperature of a fuel cell based on a driver's propensity and a rate of change in heating value.

BACKGROUND

In general, it is crucial to constantly maintain a temperature of a fuel cell since overcooling or overheating of the fuel cell in a vehicle threatens the safety of a vehicle system.

In a conventional method, a target temperature is set based on a temperature outside the vehicle, and the temperature of the fuel cell is controlled based on the target temperature. FIG. 1 is a graph illustrating a conventional example of setting the target temperature of the fuel cell according to the temperature outside the vehicle. Referring to FIG. 1, as the temperature outside the vehicle increases, the target temperature is reduced to constantly keep the temperature of the fuel cell.

However, the temperature the fuel cell is drastically changed not only by the temperature outside the vehicle but also by a driver's propensity. FIG. 2 is a graph illustrating a comparison result of output power demands between drivers having different driving propensities. Referring to FIG. 2, the output power demand is clearly higher in the driver, who has a lower defensive driving propensity (i.e., an aggressive driving propensity) than in the driver who has a higher defensive driving propensity (i.e., a mild propensity).

That is, in the case of the driver who drives aggressively, the temperature of the fuel cell is rapidly changed while driving, and it is difficult to deal with the sudden temperature change of the fuel cell when the temperature of the fuel cell is controlled only based on the temperature outside the vehicle.

This causes the overheating or the overcooling, and as a result, the vehicle system is damaged.

SUMMARY

An aspect of the present disclosure provides an apparatus and a method, which are capable of precisely controlling a temperature of a fuel cell by calculating a control factor and applying the control factor to control the temperature of the fuel cell using an ambient outside temperature and information about a driver's propensity.

In addition, another aspect of the present disclosure provides an apparatus and a method, which are capable of preventing overheating and overcooling from temporarily occurring in advance after the driver's propensity is transited by calculating a compensation value in consideration of a rate of change in heating value of a fuel cell and the transition the driver's propensity and by applying the compensation value to the control factor for the controlling of the temperature of the fuel cell.

The technical problems to be solved by the present disclosure not limited to the aforementioned problems, and any other technical problems not mentioned herein will be clearly understood from the following description by those skilled in the art to which the present disclosure pertains.

According to an aspect of the present disclosure, an apparatus for controlling a temperature of a fuel cell includes a driver propensity determination processor that determines a driver's propensity while a vehicle travels; a temperature control factor decision processor that decides a temperature control factor based an ambient temperature and the driver's propensity and controls the temperature of the fuel cell; and a storage that stores driver propensity determination information determined by the driver propensity determination processor.

The temperature control factor decision processor sets a target temperature, a feedforward control entry temperature, a feedforward control entry heating value, and a feedforward control factor based on the ambient temperature while the vehicle travels and changes the target temperature, the feedforward control entry temperature, the feedforward control entry heating value, and the feedforward control factor, which are set based on the ambient temperature, in accordance with the driver's propensity to decide a driver propensity control factor.

The driver propensity determination processor classifies and determines the driver's propensity into a first group, a second group having a lower defensive driving propensity than the first group, and a third group having lower defensive driving propensity than the second group.

The temperature control factor decision processor decides the target temperature, the feedforward control entry temperature, the feedforward control entry heating value, and the feedforward control factor, which are set based on the ambient temperature, as the driver propensity control factor in a case that the driver's propensity belongs to the first group.

The temperature control factor decision processor decides values obtained by reducing the target temperature, the feedforward control entry temperature, and the feedforward control entry heating value by a reference level and by increasing the feedforward control factor by a reference level, which are set based on the ambient temperature, as the driver propensity control factor in a case that the driver's propensity belongs to the second group.

The temperature control factor decision processor decides values obtained by reducing the target temperature, the feedforward control entry temperature, and the feedforward control entry heating value obtained when the driver's propensity belongs to the second group by a reference level and by increasing the feedforward control factor obtained when the driver's propensity belongs to the second group by a reference level as the driver propensity control factor in a case that the driver's propensity belongs to the third group.

The temperature control factor decision processor increases an output power limit reference temperature margin for changing the target temperature, sets a lower limit on the target temperature, changes the target temperature within the lower limit on the target temperature, set a lower limit on a reference of the feedforward control entry heating value or the feedforward control entry temperature when the reference of the feedforward control entry heating value or the feedforward control entry temperature is changed, changes the feedforward control entry heating value or the feedforward control entry temperature within the lower limit, sets an upper limit on the feedforward control factor, and chances the feedforward control factor within the upper limit.

The temperature control factor decision processor decides a feedforward entry time point in a case that the driver's propensity belongs to the third group to be earlier than a feedforward entry time point in a case that the driver's propensity belongs to the second group and decides a feedforward entry time point in a case that the driver's propensity belongs to the first group to be later than the feedforward entry time point in the case that the driver's propensity belongs to the second group.

The feedforward control factor includes at least one of a coolant pump revolutions per minute (RPM) control, a radiator fan RPM control, or an opening control of a coolant temperature control valve.

The apparatus for controlling the temperature of the fuel cell further includes a fuel cell heating value change rate calculator that calculates a fuel cell heating value change rate, a driver propensity transition determination processor that determines a transition case the driver's propensity, a compensation value calculator that calculates a compensation value of each of the target temperature, the feedforward control entry temperature, the feedforward control entry heating value, and the feedforward control factor based on the heating value change rate and the transition case of the driver's propensity, and a temperature control factor final decision processor that calculates a final control factor decision value using the compensation value and the driver propensity control factor.

The transition case of the driver's propensity includes at least one of a transition to a low defensive driving propensity, a transition to a high defensive driving propensity, and a propensity maintenance.

The compensation value calculator calculates a first compensation value used to increase the target temperature, the feedforward control entry temperature, and the feedforward control entry heating value and a second compensation value used to reduce a coolant pump RPM, a radiator fan RPM, and an opening command value of a coolant temperature control valve in a case that the driver's propensity is transited to the low defensive driving propensity in the transition case of the driver's propensity and the heating value change rate is equal to or smaller than a first reference value.

The compensation value calculator calculates a third compensation value used to increase the target temperature, the feedforward control entry temperature, and the feedforward control entry heating value and a fourth compensation value used to decrease the coolant pump RPM, the radiator fan RPM, and the opening command value of the coolant temperature control valve in a case that the driver's propensity is transited to the high defensive driving propensity in the transition case of the driver's propensity and the heating value change rate is equal to or greater than a second reference value greater than first reference value.

According to another aspect of the present disclosure, a W method for controlling a temperature of a fuel cell includes setting a target temperature, a feedforward control entry temperature, a feedforward control entry heating value, and a feedforward control factor based on an ambient temperature while the vehicle travels, determining a driver's propensity while the vehicle travels, changing the target temperature, the feedforward control entry temperature, the feedforward control entry heating value, and the feedforward control factor, which are set based on the ambient temperature, in accordance with the driver's propensity to decide a driver propensity control factor; calculating a compensation value with respect to the driver propensity control factor in accordance with a heating value change rate and a transition of the driver's propensity, calculating a final control factor decision value using the driver propensity control factor and the compensation value with respect to the driver propensity control factor, and controlling the temperature of the fuel cell based on the final control factor decision value.

The method includes setting a target temperature, a feedforward control entry temperature, a feedforward control entry heating value, and a feedforward control factor based on an ambient temperature while the vehicle travels, changing the target temperature, the feedforward control entry temperature, the feedforward control entry heating value, and the feedforward control factor, which are set based on the ambient temperature, in accordance with the driver's propensity, and deciding the changed value as the driver propensity control factor to control the temperature of the fuel cell.

The driver's propensity is classified into a first group, a second group having a lower defensive driving propensity than the first group, and a third group having a lower defensive driving propensity than the second group.

The chancing the target temperature, the feedforward control entry temperature, the feedforward control entry heating value, and the feedforward control factor based on the driver's propensity includes deciding the target temperature, the feedforward control entry temperature, the feedforward control entry heating value, and the feedforward control factor, which are set based on the ambient temperature, as the driver propensity control factor in a case that the driver's propensity belongs to the first group.

The changing the target temperature, the feedforward control entry temperature, the feedforward control entry heating value, and the feedforward control factor based on the driver's propensity includes deciding values obtained by decreasing the target temperature, the feedforward control entry temperature, and the feedforward control entry heating value by a reference level and by increasing the feedforward control factor by a reference level, which are set based on the ambient temperature, as the driver propensity control factor in a case that the driver's propensity belongs to the second group.

The changing the target temperature, the feedforward control entry temperature, the feedforward control entry heating value, and the feedforward control factor based on the driver's propensity includes deciding values obtained by decreasing the target temperature, the feedforward control entry temperature, and the feedforward control entry heating value obtained when the driver's propensity belongs to the second group by a reference level and by increasing the feedforward control factor obtained when the driver's propensity belongs to the second group by a reference level as the driver propensity control factor in a case that the driver's propensity belongs to the third group.

The feedforward control factor includes at least one of a coolant pump RPM, a radiator fan RPM, or an opening command value of a coolant temperature control valve.

The changing the target temperature, the feedforward control entry temperature, the feedforward control entry heating value, and the feedforward control factor based on the driver's propensity includes setting an upper limit on the feedforward control factor, changing the feedforward control factor within the upper limit, increasing an output power limit reference temperature margin for changing the target temperature, setting a lower limit on the target temperature, and changing the target temperature within the target temperature lower limit.

The changing the target temperature, the feedforward control entry temperature, the feedforward control entry heating value, and the feedforward control factor based on the driver's propensity includes deciding a feedforward entry time point in a case that the driver's propensity belongs to the third group to be earlier than a feedforward entry time point in a case that the driver's propensity belongs to the second group and deciding a feedforward entry time point in a case that the driver's propensity belongs to the first group to be later than the feedforward entry time point in the case that the driver's propensity belongs to the second group.

The method further includes controlling the temperature of the fuel cell based on the target temperature, the feedforward control entry temperature, the feedforward control entry heating value, and the feedforward control factor, which are changed based on the driver's propensity, determining the driver's propensity while driving, and storing the driver's propensity.

The method further includes calculating a fuel cell heating value change rate, determining a transition case of the driver's propensity, calculating, a compensation value of each of the target temperature, the feedforward control entry temperature, the feedforward control entry heating value, and the feedforward control factor based on the heating value change rate and the transition case of the driver's propensity, and calculating final control factor decision value using the compensation value and the driver propensity control factor.

The calculating the compensation value includes calculating a first compensation value used to increase the target temperature, the feedforward control entry temperature, and the feedforward control entry heating value and a second compensation value used to decrease the coolant pump RPM, the radiator fan RPM, and the opening command value of the coolant temperature control valve in a case that the driver's propensity is transited to a low defensive driving propensity and the heating value change rate is equal to or smaller than a first reference value and calculating a third compensation value used to decrease the target temperature, the feedforward control entry temperature, and the feedforward control entry heating value and a fourth compensation value used to increase the coolant pump RPM, the radiator fan RPM, and the opening command value of the coolant temperature control valve in a case that the driver's propensity is transited to a high defensive driving propensity and the heating value change rate is equal to or greater than a second reference value greater than first reference value.

The present technology actively deals with the variation in temperature of the fuel cell, which is changed based on the driver's propensity, and prevents the overcooling or overheating of the fuel cell, thereby minimizing the damage on the vehicle system.

In addition, the present technology determines the fuel cell temperature control factor taking into account the transition of the driver's propensity, and thus the temperature of the fuel cell may be more precisely controlled. Accordingly, a reliability of the vehicle system may be improved.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
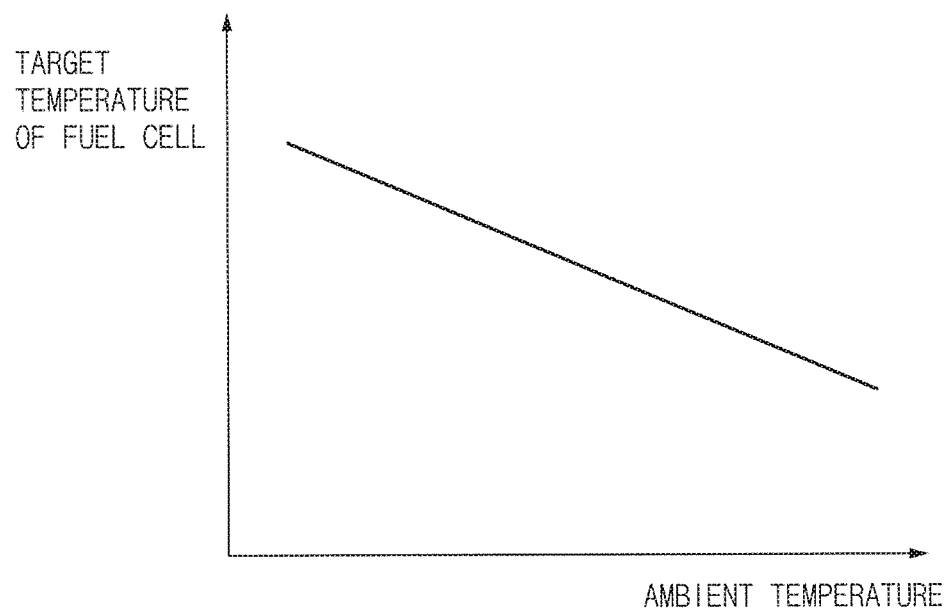
FIG. 1 is a graph illustrating a conventional example of setting a target temperature of a fuel cell according to an ambient temperature.
Figure 2:
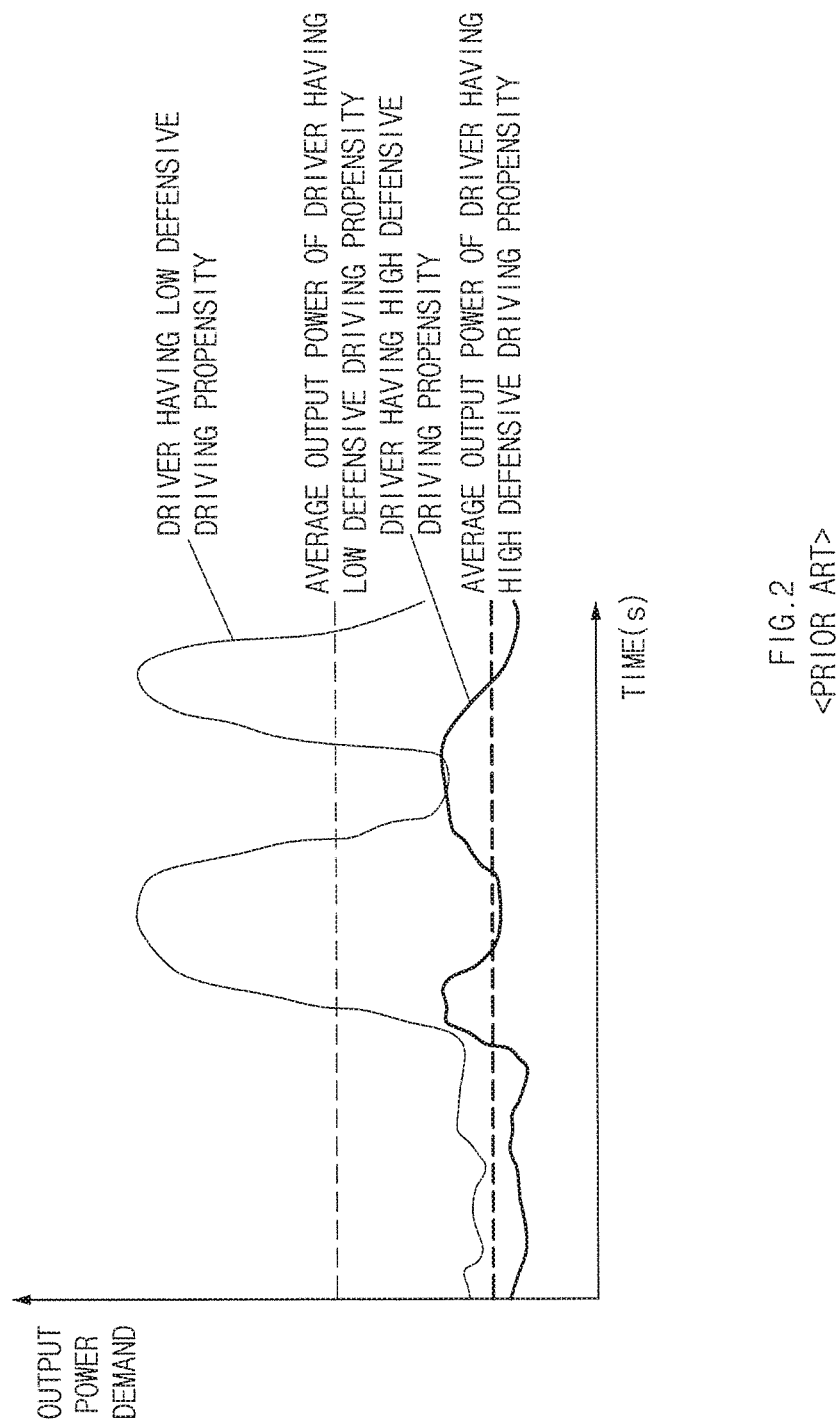
FIG. 2 is a graph illustrating a comparison result of output power demands between drivers having different driving propensities.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 3 to 17.

In the present disclosure, a target temperature to control a temperature of a fuel cell is changed using not only an ambient air temperature outside of a vehicle (hereinafter, referred to as an "ambient temperature") but also information about a driver's driving propensity (hereinafter, referred to as a "driver's propensity"), and a feedforward control entry condition is variably applied. Accordingly, a vehicle system is prevented from being damaged even though a temperature is rapidly changed by an output power demand from a driver, an acceleration performance is improved by increasing temperature margin, and overcooling or overheating of a fuel cell stack is prevented.

Figure 3:
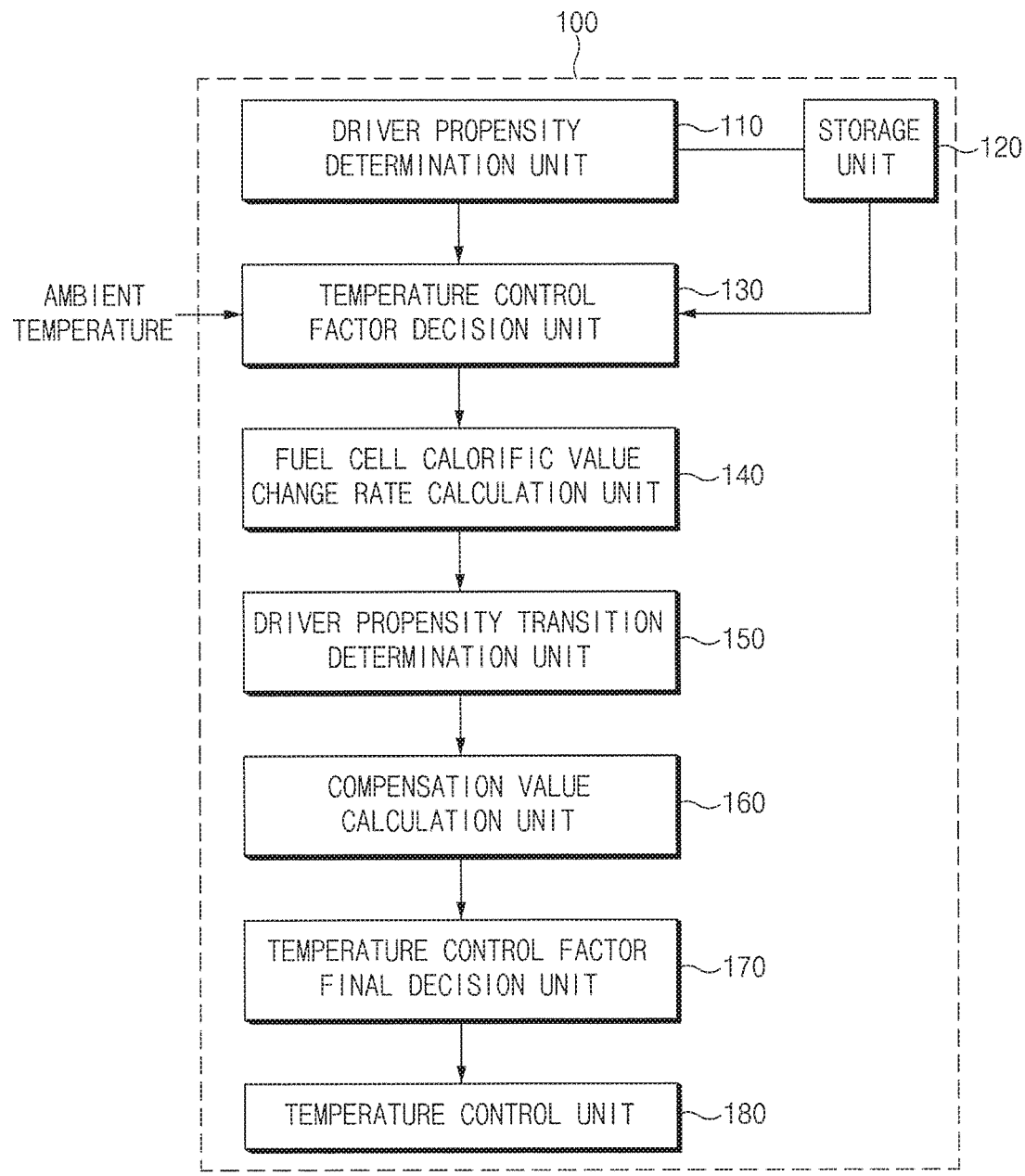
FIG. 3 is a block diagram illustrating a fuel cell temperature control apparatus according to an exemplary embodiment of the present disclosure.

FIG. 3 is a block diagram illustrating a fuel cell temperature control apparatus according to an exemplary embodiment of the present disclosure.

The fuel cell temperature control apparatus 100 may include a driver propensity determination processor 110, a storage 120, a temperature control factor decision processor 130, a fuel cell heating value change rate calculator 140, a driver propensity transition determination processor 150, a compensation value calculator 160, a temperature control factor final decision processor 170, and a temperature controller 180.

The driver propensity determination processor 110 determines a driver's propensity while a vehicle travels. In this case, the driver propensity determination processor 110 determines the driver's propensity into a first group (mild propensity), a second group (normal propensity), and a third group (aggressive propensity) based on a driver's defensive driving propensity. The defensive driving propensity of the first group is higher than that of the second group, and the defensive driving propensity of the second group is higher than that of the third group. A degree of the defensive driving propensity may be determined depending on a variation in acceleration and deceleration obtained from an acceleration average value and a deceleration average value, a use of an acceleration pedal and a brake pedal, a rapid acceleration, and the like. For instance, as the variation in acceleration and deceleration increases, the number of the acceleration pedal and the brake pedal operations increases, and the number of the rapid acceleration events increases, the driver's propensity is determined as the third group in which the defensive driving propensity is low. That is, the expression that the defensive driving propensity is low means that the aggressive propensity is high.

For the convenience of explanation, the driver's propensity will be classified into the mild propensity, the normal propensity, and the aggressive propensity in order of high to low defensive driving propensity for detailed explanation. However, the driver's propensity is not limited to the mild propensity, the normal propensity, and the aggressive propensity.

In addition, the driver propensity determination processor 110 may determined the driver's propensity by using all common techniques used to determine the driver's propensity.

The storage 120 stores driver propensity determination information obtained by the determination of the driver propensity determination processor 110.

The temperature control factor decision processor 130 sets the target temperature, a feedforward control entry temperature, a feedforward control entry heating value, and a feedforward control factor in response to the ambient temperature while the vehicle travels and changes the target temperature, the feedforward control entry temperature, the feedforward control entry heating value, and the feedforward control factor based on the driver's propensity to decide a driver propensity control factor. In this case, the feedforward control factor may include at least one of a coolant pump RPM control, a radiator fan RPM control, and a control for opening a coolant temperature control valve. In addition, the term "feedforward" used herein means a method by which a future state is predicted based on a calculation and a control is performed in accordance with predicted information. In the present disclosure, the feedforward indicates a control method in which the coolant pump RPM, the radiator fan RPM, and the coolant temperature control valve are controlled in advance using a reference temperature control factor in a case that a heating value due to the output power in use is equal to or higher than a reference level and a coolant temperature is equal to or higher than a reference level, and thus, a cooling performance is improved proactively. The feedforward control may prevent a temperature from excessively rising even though an output power is rapidly increased by a driver and may improve a tracking performance for the target temperature.

In the case that the driver's propensity is the first group (e.g., the mild propensity) having the defensive driving propensity that is relatively high, the temperature control factor decision processor 130 decides the target temperature, the feedforward control entry temperature, the feedforward control entry heating value, and the feedforward control factor, which are set based on the ambient temperature, as the driver propensity control factor.

In addition, in the case that the driver's propensity is the second group (e.g., the normal propensity) having an intermediate defensive driving propensity, the temperature control factor decision processor 130 decides values, which are obtained by adjusting downward the target temperature, the feedforward control entry temperature, and the feedforward control entry heating value, which are set by the ambient temperature, by a reference value, and by adjusting upward the feedforward control factor as the driver propensity control factor.

Further, in the case that the driver's propensity is the third group (e.g., the aggressive propensity) having the defensive driving propensity that is relatively low, the temperature control factor decision processor 130 decides values, which are obtained by adjusting downward the target temperature, the feedforward control entry temperature, and the feedforward control entry heating value of the second group (e.g., the normal propensity) having the defensive driving propensity higher than that of the third group and lower than that of the first group by a reference value and by adjusting upward the feedforward control factor of the normal propensity by a reference value, as the driver propensity control factor.

In this case, the output power demand while driving increases in the order of the first group (mild propensity) the second group (normal propensity), and the third group (aggressive propensity).

The various embodiments disclosed herein, including embodiments of the fuel cell temperature control apparatus 100 and/or elements thereof, can be implemented using one or more processors coupled to a memory (or other non-transitory machine readable recording medium) storing computer-executable instructions for causing the processor(s) to perform the functions described above including the functions described in relation to the driver propensity determination processor 110, the temperature control factor decision processor 130, the fuel cell heating value change rate calculator 140, the driver propensity transition determination processor 150, the compensation value calculator 160, the temperature control factor final decision processor 170, and the temperature controller 180.

Figure 4:
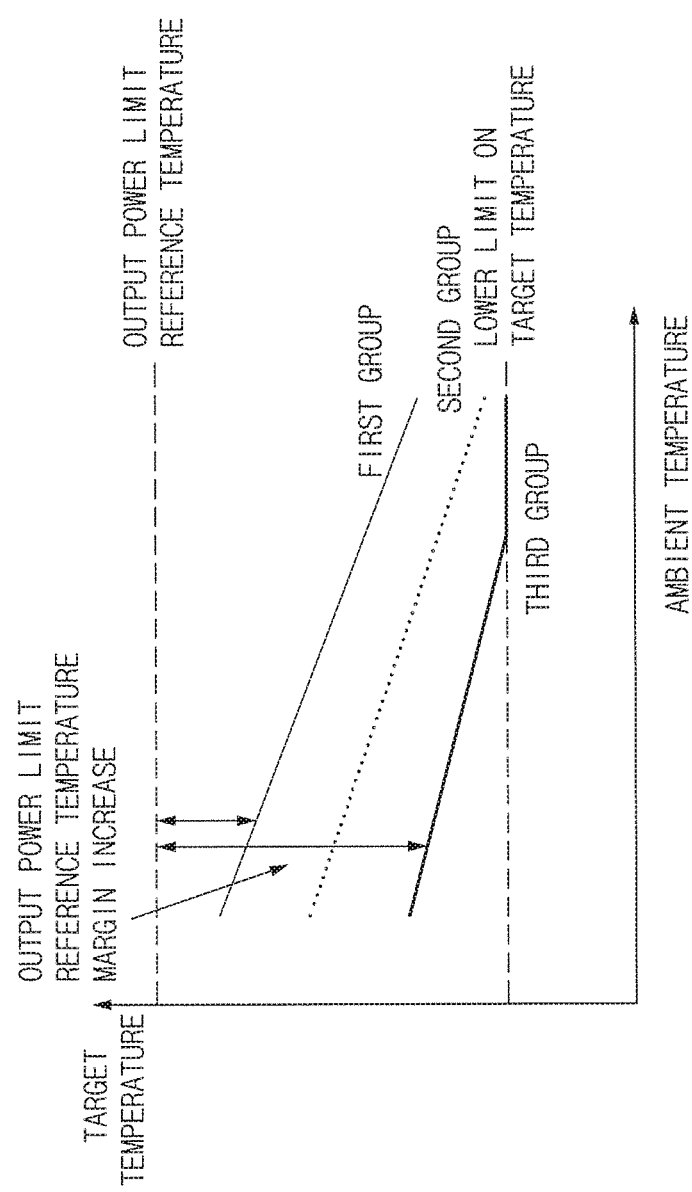
FIG. 4 is a graph illustrating a variation of a target temperature according to an ambient temperature for each driver's propensity according to an exemplary embodiment of the present disclosure.
Figure 5:
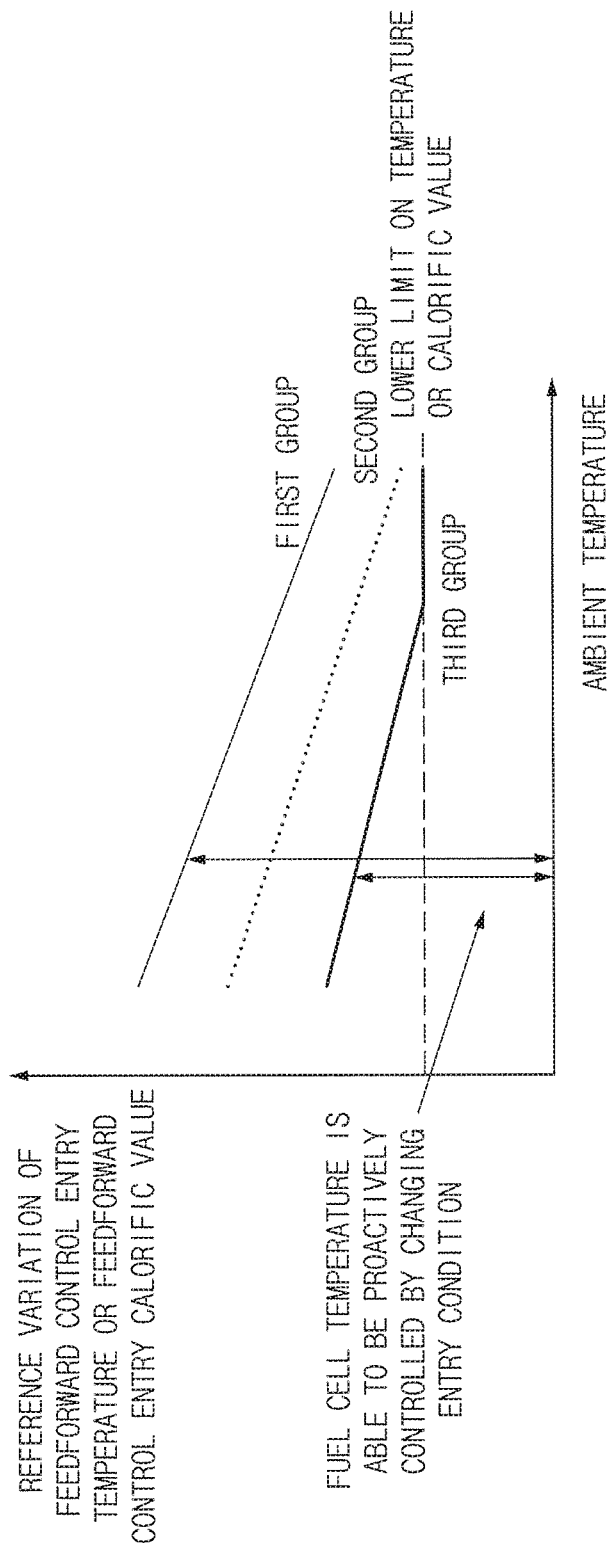
FIG. 5 is a graph illustrating a variation of a feedforward control entry temperature or a variation of a heating value reference according to an ambient temperature for each driver's propensity according an exemplary embodiment of the present disclosure.
Figure 6:
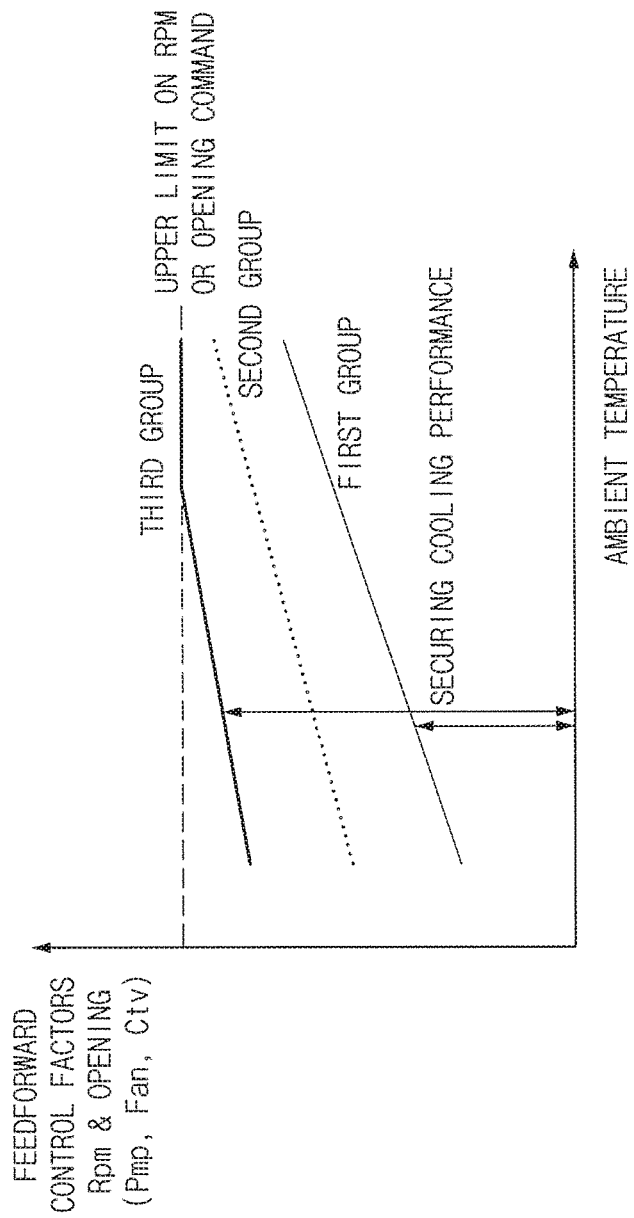
FIG. 6 is a graph illustrating an RPM and a Ctv opening command when a feedforward control is performed according to an ambient temperature for each driver's propensity according to an exemplary embodiment of the present disclosure.

FIG. 4 is a graph illustrating a variation of a target temperature according to the ambient temperature for each driver's propensity according to an exemplary embodiment of the present disclosure, FIG. 5 is a graph illustrating a reference variation of a feedforward control entry temperature or feedforward control entry heating value according to the ambient temperature for each driver's propensity according to an exemplary embodiment of the present disclosure, and FIG. 6 is a graph illustrating an RPM and a Ctv opening command when a feedforward control is performed according to the ambient temperature for each driver's propensity according to an exemplary embodiment of the present disclosure.

Referring to FIG. 4, the temperature control factor decision processor 130 increases an output power limit reference temperature margin, sets a lower limit on the target temperature, and changes the target temperature within the target temperature lower limit. Since the lower limit on the target temperature is set as described above, the overcooling or the overheating, which occurs when the output power is not required after a sudden output power demand by a driver belonging to the third group (aggressive propensity), may be prevented from occurring. Referring to FIG. 4, the target temperature is set such that the target temperature increases in order of the third group (aggressive propensity), the second group (normal propensity), the first group (mild propensity).

Referring to FIG. 5, when the reference heating value or the reference temperature for the feedforward control entry is changed, the temperature control factor decision processor 130 sets a lower limit and changes the reference heating value or the reference temperature for the feedforward control entry within the lower limit. Referring to FIG. 5, the reference heating value or the reference temperature for the feedforward control entry is set such that the reference heating value or the reference temperature increases in order of the third group (aggressive propensity), the second group (normal propensity), the first group (mild propensity).

That is, the temperature control factor decision processor 130 decides to allow a feedforward entry time point when the driver's propensity belongs to the third group (aggressive propensity) to be earlier than a feedforward entry time point when the driver's propensity belongs to the second group (normal propensity), and the temperature control factor decision processor 130 decides to allow a feedforward entry time point when the driver's propensity belongs to the first group (mild propensity) to be later than the feedforward entry time point when the driver's propensity belongs to the second group (normal propensity). As described above, in the case of the aggressive propensity, the feedforward control entry is quickly accomplished to promptly control the fuel cell temperature, and thus the overheating or the overcooling may be minimized.

Referring to FIG. 6, the control factor (e.g., the coolant pump RPM control, the radiator fan RPM control, the control for opening the coolant temperature control valve, etc.) is changed based on the driver's propensity during the feedforward control, and an extent of variation in the control factor decreases in order of the third group (aggressive propensity), the second group (normal propensity), the first group (mild group). In this case, the temperature control factor decision processor 130 sets an upper limit of the feedforward control factor and changes the feedforward control factor w thin the upper limit, thereby preventing the overcooling and a flooding.

That is, the temperature control factor decision processor 130 increases the control factor to secure the cooling performance at an early stage since the rapidly-output power demand is predictable in the case the driver belongs to the third group (aggressive propensity).

Figure 7:
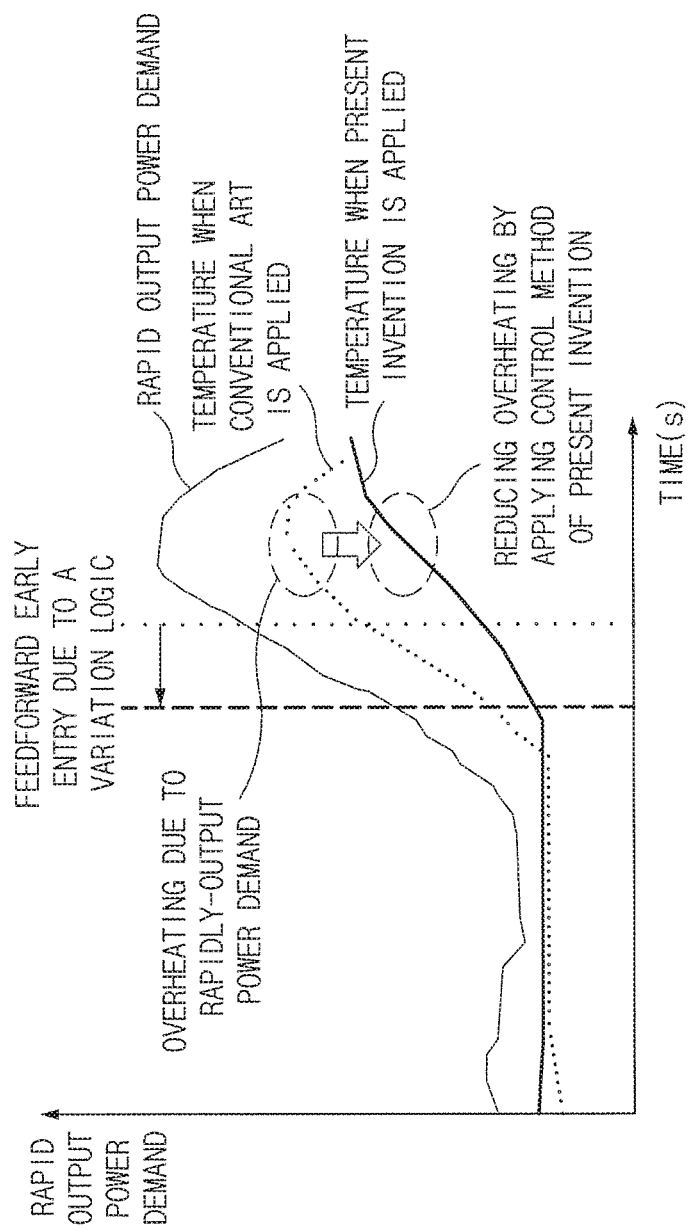
FIG. 7 is a graph illustrating a comparison result between the fuel cell temperature control based on the driver's propensity according to an exemplary embodiment of the present disclosure and a conventional fuel cell temperature control.

FIG. 7 is a graph illustrating a comparison result between the fuel cell temperature control based on the driver's propensity according to an exemplary embodiment of the present disclosure and a conventional fuel cell temperature control. Referring to the fuel cell temperature control according to the present disclosure may minimize the damage resulting from the overheating due to a temperature variation by the rapid output power demand from the driver and may be effectively performed when compared to the conventional temperature control technology. This may be achieved by proactively securing of the target temperature margin and by the aggressive feedforward control method of the present disclosure.

The fuel cell heating value change rate calculator 140 calculates a fuel cell heating value change rate.

The driver propensity transition determination processor 150 determines a driver propensity transition case.

Although the fuel cell target temperature is set high based on the driver's propensity that is determined as the mild propensity in a long-term perspective, a driving situation corresponding to the second group (normal propensity) or the third group (aggressive propensity), which temporarily requires the rapid output power, may occur. In this case, a driving situation control factor is set to correspond to the second group (normal propensity) or the third group (aggressive propensity), and as a result, an overcooling situation may occur. On the contrary, in a case that the driver having the driver's propensity corresponding to the third group (aggressive propensity) in the long-term perspective drives the vehicle like the first group (mild propensity) temporarily, the driving situation control factor is set to correspond to the first group (mild propensity), and as a result, an overheating situation may occur. Therefore, it is required to determine the driver's propensity not only in the long-term perspective but also in a short-term perspective, i.e., to determine the driver propensity transition, to perform a compensation control corresponding to the determination result.

In this case, the driver propensity transition may include various cases, e.g., a transition to the low defensive driving propensity (mild propensity→normal propensity, mild propensity→aggressive propensity, normal propensity→aggressive propensity), a transition to the high defensive driving propensity (aggressive propensity→normal propensity, aggressive propensity→mild propensity, normal propensity mild propensity), a propensity maintenance (aggressive propensity→aggressive propensity, normal propensity→normal propensity, mild propensity→mild propensity).

The compensation value calculator 160 calculates compensation value of each of the target temperature, the feedforward control entry temperature, the feedforward control entry heating value, and the feedforward control factor based on the heating value change rate and the driver propensity transition case.

In the fuel cell vehicle, the output power demand occurs by an operation of the motor for the vehicle's driving, an auxiliary machinery, and an air conditioning unit, however, a factor that directly controls the temperature of the fuel cell is a heating value factor. Accordingly, the compensation value calculator 160 may predict the output power demand of the fuel cell using the heating value change rate and calculate the compensation value.

Figure 8:
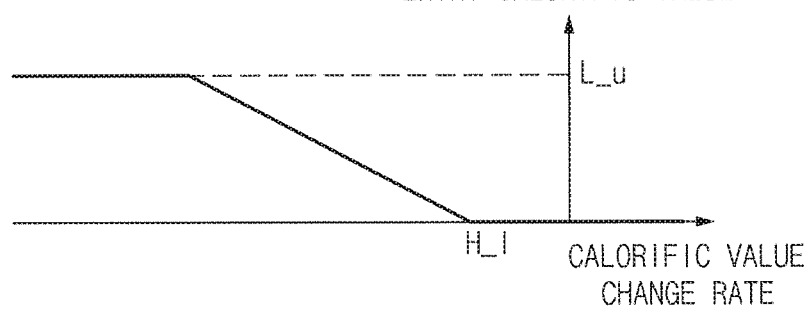
FIG. 8 is a graph illustrating a compensation value of each of the target temperature, the feedforward control entry temperature, and the feedforward control entry heating value in the case that the driver's propensity is transited to the low defensive driving propensity according to an exemplary embodiment of the present disclosure.

FIG. 8 is a graph illustrating a compensation value of each of the target temperature, the feedforward control entry temperature, and the feedforward control entry heating value in the case that the driver's propensity is transited to the low defensive driving propensity according to an exemplary embodiment of the present disclosure. Referring to FIG. 8, in a case that the heating value change rate is equal to or smaller than a first reference value H_1 in the transition to the low defensive driving propensity (mild propensity→normal propensity, mild propensity→aggressive propensity, normal propensity aggressive propensity), the compensation value L_u may be calculated with respect to the target temperature, the feedforward control entry temperature, and the feedforward control entry heating value. That is, in a case that the heating value change rate has a negative (−) value in a state in which the control factor of the third group (aggressive propensity) is set, a current driving situation is determined that the driver's propensity is the first group (mild propensity), and a control factor value of the first group (mild propensity) may be set as the compensation value L_u. For instance, in the case that the target temperature of the first group (mild propensity) is set to about 60 Celsius degrees, the target temperature of the second group (normal propensity) is set to about 58 Celsius degrees, and the heating value change rate is equal to or smaller than the first reference value H_1 in the state in which the target temperature of the second group (normal propensity) is set as a current target temperature, a difference of about 2 Celsius degrees between the target temperature of the second group (normal propensity) and the target temperature of the first group (mild propensity) may be set to the compensation value L_u. However, the compensation value L_u is set not to exceed a target temperature (e.g., about 60 Celsius degrees) of a former driver's propensity (e.g., the mild propensity). In this case, the first reference value H_1 may be smaller than zero (0).

Figure 9:
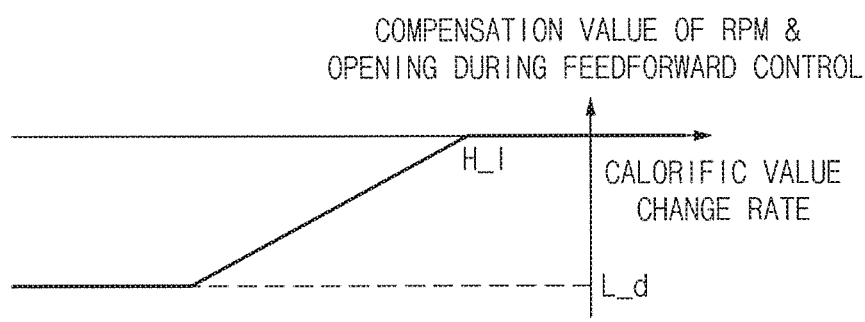
FIG. 9 is a graph illustrating a compensation value of each of a feedforward pump RPM, a fan RPM, and a valve opening in the case that the driver's propensity is transited to the low defensive driving propensity according to an exemplary embodiment of the present disclosure.

FIG. 9 is a graph illustrating a compensation value of each of a feedforward pump RPM, a fan RPM, and a valve opening in the case that the driver's propensity is transited to the low defensive driving propensity according to an exemplary embodiment of the present disclosure. Referring to FIG. 9, in the case that the heating value change rate is equal to or smaller than a first reference value H_1, a compensation value L_d is calculated with respect to the pump Rmp, the fan RPM, and a valve command value. In this case, the compensation value L_d may be calculated to have a negative (−) value to adjust downward the driver propensity control factor.

The examples shown in FIGS. 8 and 9 show cases in which the control factor that is initially set to the first group (mild propensity) is changed to the second group (normal propensity) during the driving of the vehicle. In the case that it is determined that the vehicle is actually driven with the first group (mild propensity) corresponding to a former propensity based on the heating value change rate even though the control factor based on the second group (normal propensity) is being performed, the compensation value is calculated to be close to the value of the control factor of the first group (mild propensity) that is the former propensity.

Figure 10:
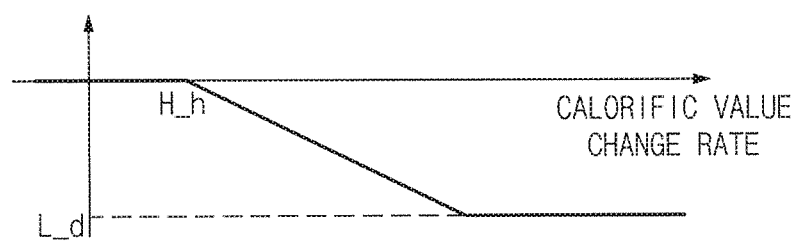
FIG. 10 is a graph illustrating a compensation value of each of the target temperature, the feedforward control entry temperature, and the feedforward control entry heating value in the case that the driver's propensity is transited to the high defensive driving propensity according to an exemplary embodiment of the present disclosure.

FIG. 10 is a graph illustrating a compensation value of each of the target temperature, the feedforward control entry temperature, and the feedforward control entry heating value in the case that the driver's propensity is transited to the high defensive driving propensity according to an exemplary embodiment of the present disclosure. Referring to FIG. 10, in a case that the driver's propensity is transited to the high defensive driving propensity (aggressive propensity→normal propensity, aggressive propensity→mild propensity, normal propensity→mild propensity) and the heating value change rate becomes equal to or greater than a second reference value H_h, it is determined that the vehicle is driven with the aggressive propensity although the control factor is initially set to the mild propensity. Thus, the compensation value L_d may be calculated to have a negative (−) value with respect to the target temperature, the feedforward control entry temperature, and the feedforward control entry heating value to adjust downward the target temperature, the feedforward control entry temperature, and the feedforward control entry heating value. In this case, the second reference value H_h may be greater than zero (0) and greater than the first reference vale H_1.

Figure 11:
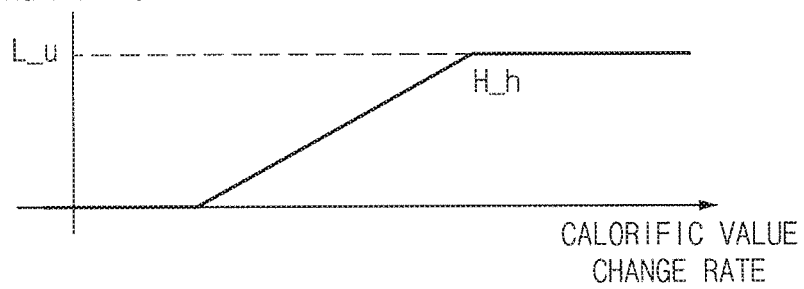
FIG. 11 is a graph illustrating a compensation value of each of the feedforward pump RPM, the fan RPM, and the valve opening in the case that the driver's propensity is transited to the high defensive driving propensity according to an exemplary embodiment of the present disclosure.

FIG. 11 is a graph illustrating a compensation value of each of the feedforward pump RPM, the fan RPM, and the valve opening in the case that the driver's propensity is transited to the high defensive driving propensity according to an exemplary embodiment of the present disclosure. Referring to FIG. 11, in the case that the heating value change rate is equal to or greater than a second reference value H_h after the control factor is set to the first group (mild propensity), it is determined that the vehicle travels with the third group (aggressive propensity), and thus, a compensation value L_u is calculated to adjust upward the feedforward pump RPM, the fan RPM, and the valve opening command value.

The examples shown in FIGS. 10 and 11 show cases in which the control factor that is initially set to the third group (aggressive propensity) is changed to the first group (mild propensity) during the driving of the vehicle. In the case that it is determined that the vehicle is actually driven with the third group (aggressive propensity) corresponding to a former propensity based on the heating value change rate even though the control factor based on the first group (mild propensity) is being performed, the compensation value is calculated to close to the value of the control factor of the third group (aggressive propensity) that is the former driver's propensity.

Figure 12:
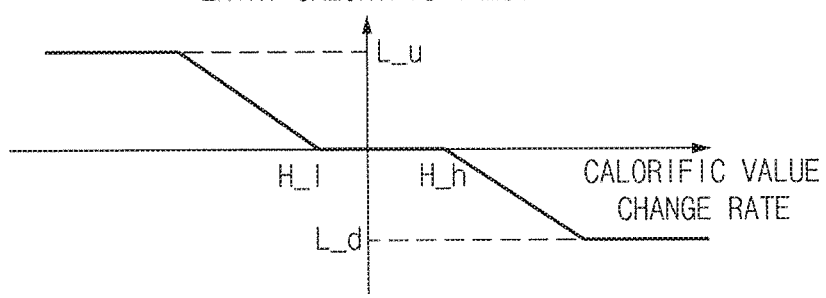
FIG. 12 is a graph illustrating a compensation value of each of the target temperature, the feedforward control entry temperature, and the feedforward control entry heating value in the case that the driver's propensity is maintained without being changed according to an exemplary embodiment of the present disclosure.
Figure 13:
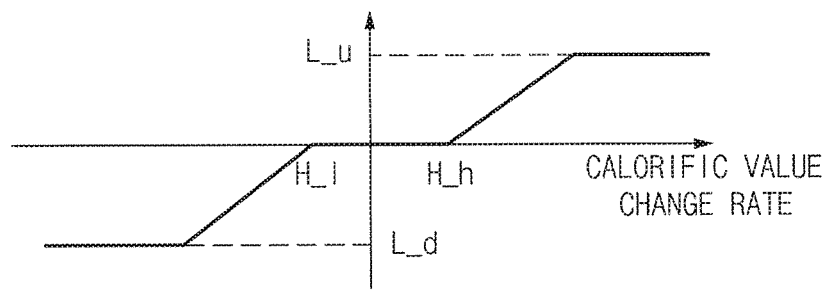
FIG. 13 is a graph illustrating a compensation value of each of the feedforward pump RPM, the fan RPM, and the valve opening in the case that the driver's propensity is maintained without being changed according to an exemplary embodiment of the present disclosure.

FIG. 12 is a graph illustrating a compensation value of each of the target temperature, the feedforward control entry temperature, and the feedforward control entry heating value in the case that the driver's propensity is maintained without being changed according to an exemplary embodiment of the present disclosure, and FIG. 13 is a graph illustrating a compensation value of each of the feedforward pump RPM, the fan RPM, and the valve opening in the case that the driver's propensity is maintained without being changed according to an exemplary embodiment of the present disclosure.

Referring to FIGS. 12 and 13, in the case that the heating value change rate is equal to or greater than the first reference value H_l and equal to or smaller than the second reference value H_h, the compensation value is determined to have a value between the first reference value H_l and the second reference value H_h due to the maintained driver's propensity.

The temperature control factor final decision processor 170 adds the compensation value calculated by the compensation value calculator 160 to the driver propensity control factor to calculate the final control factor decision value as the following Equation 1.

Final control factor decision value=driver propensity control factor+control factor compensation value based on the driver propensity transition    Equation 1

The temperature controller 180 controls the opening of the coolant temperature control valve Ctv, the coolant pump (Pmp) RPM, and the radiator fan (Fan) RPM based on the fuel cell target temperature determined by the ambient temperature, the driver's propensity, and the driver propensity transition.

In addition, the temperature controller 180 performs the feedforward control to prevent the temperature from excessively increasing due to the rapid output power increase by the driver and to improve the tracking performance for the target temperature. That is, in the case that the heating value due to the output power in use is equal to or greater than a reference level and the coolant temperature is equal to or greater than a reference level, the coolant performance is proactively improved based on the coolant pump (Pmp) RPM, the radiator fan (Fan) RPM, and the opening of the coolant temperature control valve (Ctv), which are previously determined.

That is, the temperature controller 180 controls the temperature of the fuel cell based on the final control factor obtained by the driver propensity control factor and the compensation value, and the driver propensity control factor is obtained by varying the target temperature, the feedforward control entry temperature, the feedforward control entry heating value, and the feedforward control factor, which are determined by the ambient temperature and the driver's propensity.

Figure 14:
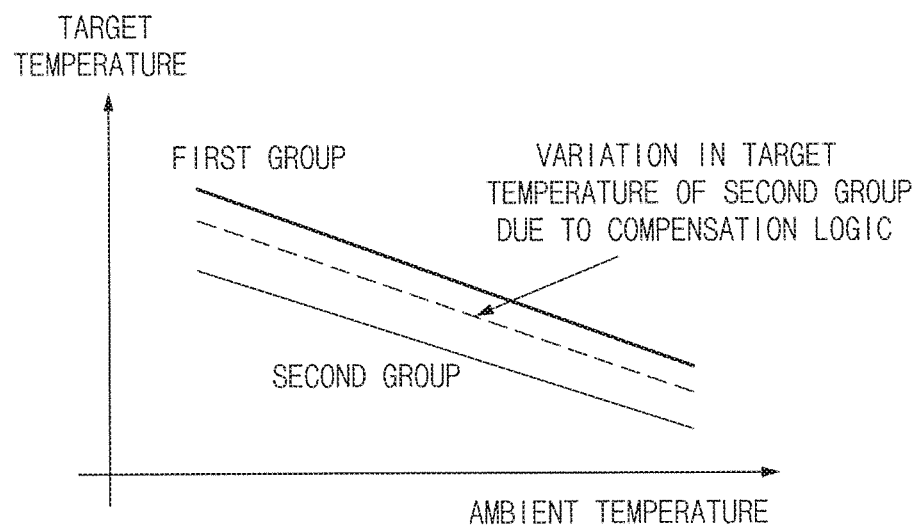
FIG. 14 is a graph illustrating a variation in the target temperature of the second group (normal propensity) by applying the compensation value according to an exemplary embodiment of the present disclosure.

FIG. 14 is a graph illustrating a variation in the target temperature of the second group (normal propensity) by applying the compensation value according to an exemplary embodiment of the present disclosure. FIG. 14 shows an embodiment of determining the target temperature when the fuel cell temperature control method based on the driver's propensity and the compensation control based on the short-term changed rate in heating value are applied together. That is, the target temperature may be changed by a compensation logic after the driver's propensity is transited to the second group (normal propensity).

Figure 15:
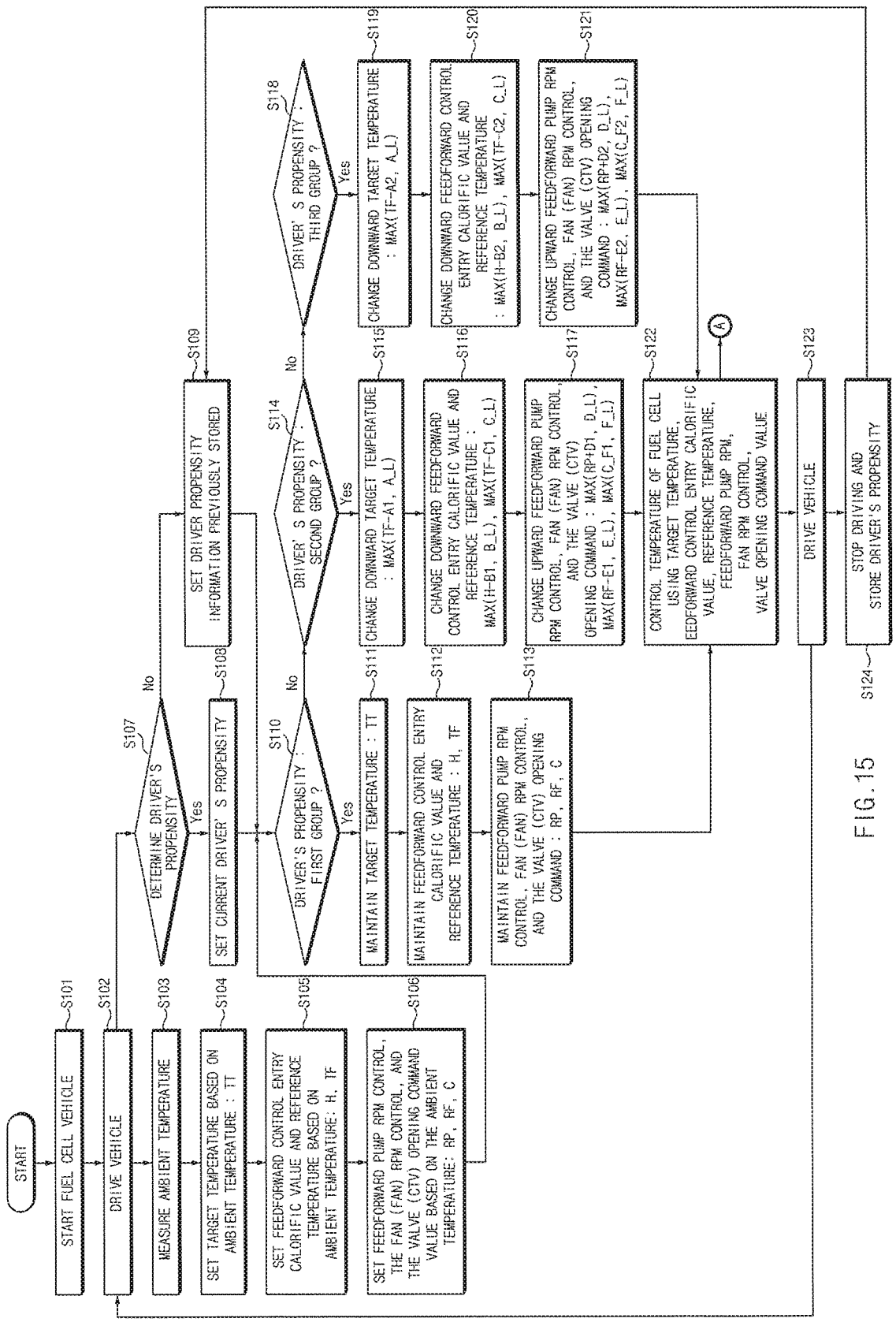
FIG. 15 is a flowchart illustrating a method for controlling a temperature of a fuel cell based on a driver's propensity according to an exemplary embodiment of the present disclosure.

Hereinafter, a fuel cell temperature control method based on the driver's propensity according to an exemplary embodiment of the present disclosure will be described with reference to FIG. 15.

First, when the fuel cell vehicle starts up (S101) and the fuel cell vehicle starts driving (S102), the fuel cell temperature control apparatus 100 measures the ambient temperature (S103).

Then, the fuel cell temperature control apparatus 100 sets the target temperature Tt based on the ambient temperature (S104).

The fuel cell temperature control apparatus 100 sets the feedforward control entry heating value (H) and the reference temperature (Tf) based on the ambient temperature (S105).

Then, the fuel cell temperature control apparatus 100 sets the feedforward pump (Pmp) RPM control (Rp), the fan (Fan) RPM control (Rf), the valve (Ctv) opening command value (C) based on the ambient temperature (S106).

The fuel cell temperature control apparatus 100 determines the driver's propensity (S107) and sets a current driver's propensity (S108). Meanwhile, in a case that the driver's propensity is not determined, driver propensity information previously stored during previous driving is set to the current driver's propensity (S109). In this case, the determination and setting of the driver's propensity may be performed while the vehicle travels in operation S102 without being limited in operations after operation S106.

Then, in the case that the driver's propensity belongs to the first group (mild propensity) (S110), the fuel cell temperature control apparatus 100 maintains the target temperature (Tt) with respect to the ambient temperature, the feedforward control entry heating value (H) and the reference temperature (Tf) with respect to the ambient temperature, and the pump (Pmp) RPM (Rp), the fan (Fan) RPM (Rf), and the valve (Ctv) opening command value (C) under the feedforward control with respect to the ambient temperature (S111, S112, and S113).

In the case that the driver's propensity belongs to the second group (normal propensity) (S114), the fuel cell temperature control apparatus 100 changes downward the target temperature by a1 max(Tt−a1, a_L) (S115), changes downward the feedforward control entry heating value and the reference temperature by b1 and c1, respectively, max (H−b1, max(Tf−c1, c_L) (S116), and changes upward the pump RPM, the fan RPM, the valve (Ctv) opening command value under the feedforward control max(Rp+d1, d_L), max(Rf−e1, max (C+f1, f_L) (S117).

When the driver's propensity belongs to the third group (aggressive propensity) (S118), the fuel cell temperature control apparatus 100 changes downward the target temperature by a2 max(Tt−a2, a_L) (S119), changes downward the feedforward control entry heating value and the reference temperature by b2 and c2, respectively, max(H−b2, b_L), max(Tf−c2, c_L) (S120), and changes upward the pump RPM, the fan RPM, the valve (Ctv) opening command value under the feedforward control max (Rp+d2, d_L), max(Rf−e2, e_L), max(C+f2, f_L) (S121).

Here, Tt, H, Tf, Rp, Rf, and C denote the target temperature, the feedforward control entry heating value, the reference temperature, and the pump (Pmp) RPM, the fan (Fan) RPM, and the valve (Ctv) opening command value under the feedforward control, respectively, when the driver's propensity is the mild propensity, a1 and a2, b1 and b2, c1 and c2, d1 and d2, e1 and e2, and f1 and f2 denote variation values of the target temperature, the feedforward control entry heating value, the reference temperature, and the pump (Pmp), the fan (Fan) RPM, and the valve (Ctv) opening command value under feedforward control, respectively, based on the driver's propensity, and a_L, b_L, c_L, d_L, e_L, and f_L denote upper; lower limit values of the variation values. In addition, a1, a2, b1, b2, c1, c2, d1, d2, e1, e2, f1, and f2 satisfy the following inequality of 0<a1, b1, c1, d1, e1, f1<a2, b2, c2, d2, e2, f2.

Then, the fuel cell temperature control apparatus 100 controls the temperature of the fuel cell using the target temperature, the feedforward control entry heating value, the reference temperature, the pump RPM, the fan RPM control, the valve opening command value, which are determined in accordance with each driver's propensity (S122).

After that, the fuel cell vehicle continuously travels (S123), and in the case that the fuel cell vehicle stops driving, the fuel cell temperature control apparatus 100 stores the driver propensity information (S124).

Figure 16:
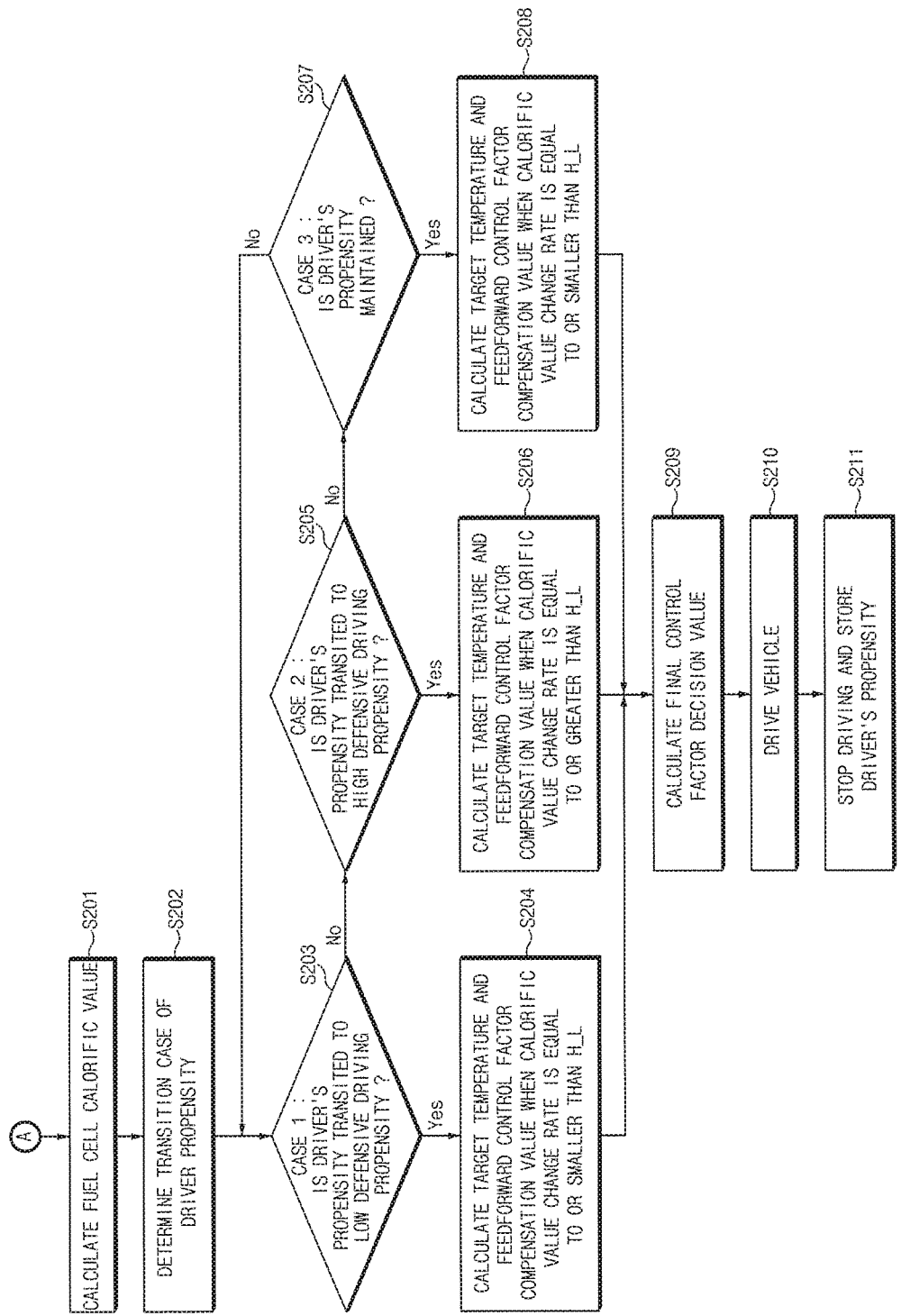
FIG. 16 is a flowchart illustrating a method for controlling a temperature of a fuel cell based on a transition of a driver's propensity according to an exemplary embodiment of the present disclosure.

Hereinafter, the fuel cell temperature control method based on the driver propensity transition according to an exemplary embodiment of the present disclosure will be described with reference to FIG. 16.

The fuel cell temperature control apparatus 100 calculates the fuel cell heating value (S201).

Then, the fuel cell temperature control apparatus 100 determines the driver propensity transition case (3202).

In the case that the driver's propensity is transited to the low defensive driving propensity (S203) and the heating value change rate is equal to or smaller than H_l, the fuel cell temperature control apparatus 100 calculates the target temperature and a feedforward control factor compensation value (8204).

Then, in the case that the driver's propensity is transited to the high defensive driving propensity (S205) and the heating value change rate is equal to or greater than H_l, the fuel cell temperature control apparatus 100 calculates the target temperature and the feedforward control factor compensation value (S206).

In the case that the driver's propensity is maintained (S207) and the heating value change rate is equal to or smaller than H_l, the fuel cell temperature control apparatus 100 calculates the target temperature and the feedforward control factor compensation value (S208).

Then, the fuel cell temperature control apparatus 100 adds the control factor based on the driver's propensity and the compensation value based on the driver propensity transition to determine the final control factor (S209).

The fuel cell vehicle continuously travels (S210), and in the case that the fuel cell vehicle stops driving, the fuel cell temperature control apparatus 100 stores the driver's propensity (S211).

As described above, the temperature of the fuel cell is controlled by taking into account the ambient temperature, the driver's propensity, and the driver propensity transition, and thus the fuel cell may be prevented from overheating or overcooling, thereby preventing a vehicle system from being damaged.

Figure 17:
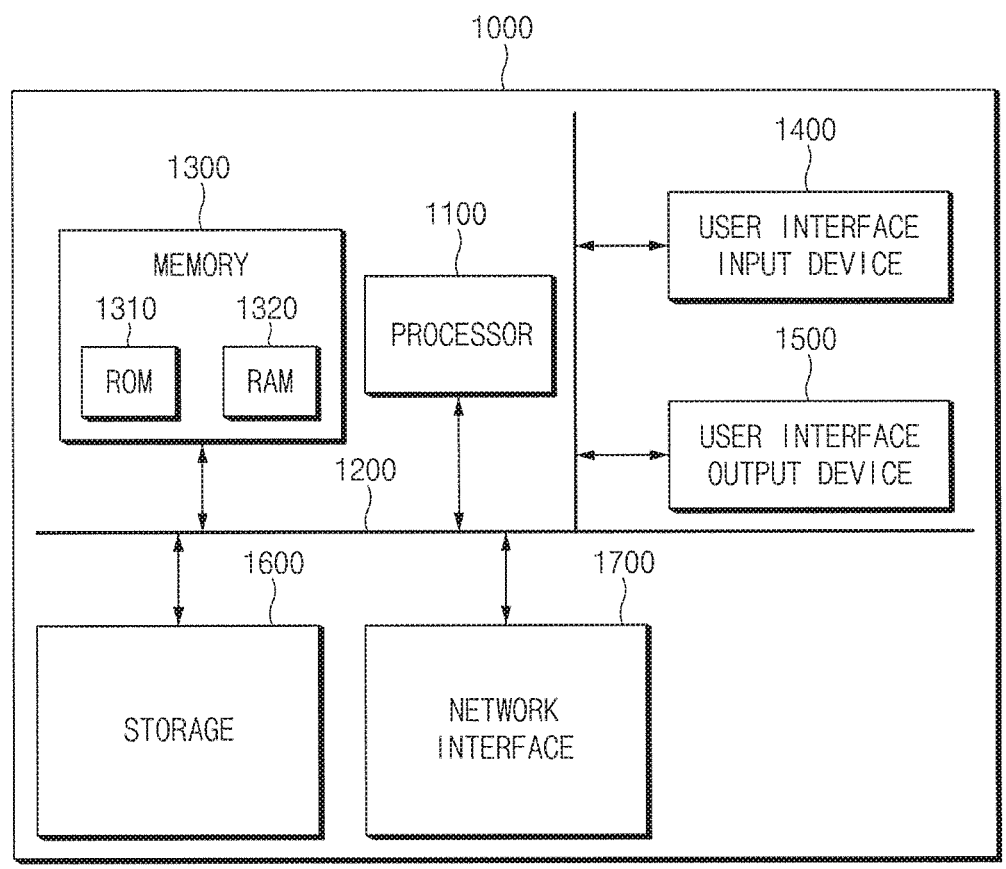
FIG. 17 is a block diagram illustrating a configuration of a computing system to which the fuel cell temperature control method is applied according to an exemplary embodiment of the present disclosure.

FIG. 17 is a block diagram illustrating a configuration of a computing system 1000 to which the fuel cell temperature control method is applied, according an exemplary embodiment of the present disclosure.

Referring to FIG. 17, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component in the user terminal.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. An apparatus for controlling a temperature of a fuel cell, the apparatus comprising:
a driver propensity determination processor configured to determine a driver's propensity while a vehicle travels;
a temperature control factor decision processor configured to:
determine a temperature control factor based on an ambient temperature and the driver's propensity and to control the temperature of the fuel cell,
set a target temperature, a feedforward control entry temperature, a feedforward control entry heating value, and a feedforward control factor based on the ambient temperature while the vehicle travels, and
change the target temperature, the feedforward control entry temperature, the feedforward control entry heating value, and the feedforward control factor in accordance with the driver's propensity to determine a driver propensity control factor;

a fuel cell heating value change rate calculator configured to calculate a fuel cell heating value change rate;

a driver propensity transition determination processor configured to determine a transition case of the driver's propensity; and a compensation value calculator configured to:
  calculate a compensation value of each of the target temperature, the feedforward control entry temperature, the feedforward control entry heating value, and the feedforward control factor based on the fuel cell heating value change rate and the transition case of the driver's propensity, and
  when the driver's propensity is transited to a low defensive driving propensity in the transition case of the driver's propensity and the fuel cell heating value change rate is equal to or smaller than a first reference value, calculate a first compensation value which increases the target temperature, the feedforward control entry temperature, and the feedforward control entry heating value, and a second compensation value which decreases a coolant pump Revolutions Per Minute (RPM), a radiator fan RPM, and an opening command value of a coolant temperature control valve, wherein the temperature control factor decision processor is configured to:
  increase an output power limit reference temperature margin for changing the target temperature;
  set a lower limit on the target temperature;
  change the target temperature within the lower limit on the target temperature;
  set a lower limit on a reference temperature value of the feedforward control entry heating value or the feedforward control entry temperature when the reference temperature value of the feedforward control entry heating value or the feedforward control entry temperature is changed;
  change the reference temperature value of the feedforward control entry heating value or the feedforward control entry temperature within the lower limit set an upper limit on the feedforward control factor; and
  change the feedforward control factor within the upper limit.

2. The apparatus of claim 1, wherein the driver propensity determination processor is configured to classify and determine the driver's propensity into a first group, a second group having a lower defensive driving propensity than the first group, and a third group having a lower defensive driving propensity than the second group.

3. The apparatus of claim 2, wherein the temperature control factor decision processor is configured to determine the target temperature, the feedforward control entry temperature, the feedforward control entry heating value, and the feedforward control factor as the driver propensity control factor in a case that the driver's propensity belongs to the first group.

4. The apparatus of claim 3, wherein the temperature control factor decision processor is configured to determine values, which are obtained by decreasing the target temperature, the feedforward control entry temperature, and the feedforward control entry heating value by a first reference level and by increasing the feedforward control factor by a second reference level, as the driver propensity control factor in a case that the driver's propensity belongs to the second group.

5. The apparatus of claim 4, wherein the temperature control factor decision processor is configured to determine values obtained by decreasing the target temperature, the feedforward control entry temperature, and the feedforward control entry heating value obtained when the driver's propensity belongs to the second group by a third reference level and by increasing the feedforward control factor obtained when the driver's propensity belongs to the second group by a fourth reference level as the driver propensity control factor in a case that the driver's propensity belongs to the third group.

6. The apparatus of claim 2, wherein the temperature control factor decision processor is configured to:
  determine a feedforward entry time point in a case that the driver's propensity belongs to the third group to be earlier than a feedforward entry time point in a case that the driver's propensity belongs to the second group; and
  determine a feedforward entry time point in a case that the driver's propensity belongs to the first group to be later than the feedforward entry time point in the case that the driver's propensity belongs to the second group.

7. The apparatus of claim 2, further comprising a temperature control factor final decision processor configured to calculate a final control factor decision value using the compensation value and a driver propensity control factor.

8. The apparatus of claim 1, wherein the feedforward control factor comprises at least one of a coolant pump revolutions per minute (RPM) control, a radiator fan RPM control, or an opening control of a coolant temperature control valve.

9. The apparatus of claim 1, wherein the compensation value calculator is configured to:
  calculate a third compensation value, which decreases the target temperature, the feedforward control entry temperature, and the feedforward control entry heating value and a fourth compensation value, which increases the coolant pump RPM, the radiator fan RPM, and the opening command value of the coolant temperature control valve in a case that the driver's propensity is transited to a high defensive driving propensity in the transition case of the driver's propensity and the fuel cell heating value change rate is equal to or greater than a second reference value greater than first reference value.

10. A method for controlling a temperature of a fuel cell, the method comprising:
  setting, by a temperature control factor decision processor, a target temperature, a feedforward control entry temperature, a feedforward control entry heating value, and a feedforward control factor based on an ambient temperature while the vehicle travels;
  changing, by the temperature control factor decision processor, the target temperature, the feedforward control entry temperature, the feedforward control entry heating value, and the feedforward control factor in accordance with the driver's propensity;
  determining, by the temperature control factor decision processor, the changed value as a driver propensity control factor to control the temperature of the fuel cell;
  controlling, a by temperature control factor decision processor, the temperature of the fuel cell based on the target temperature, the feedforward control entry temperature, the feedforward control entry heating value, and the feedforward control factor, which are changed based on the driver's propensity;

determining, by a driver propensity determination processor, the driver's propensity while the vehicle travels to store the driver's propensity;

calculating a fuel cell heating value change rate;

determining a transition case of the driver's propensity; and calculating a compensation value of each of the target temperature, the feedforward control entry temperature, the feedforward control entry heating value, and the feedforward control factor based on the fuel cell heating value change rate and the transition case of driver's propensity, wherein, when the driver's propensity is transited to a low defensive driving propensity and the fuel cell heating value change rate is equal to or smaller than a first reference value, the calculating a compensation value comprises calculating a first compensation value, which increases the target temperature, the feedforward control entry temperature, and the feedforward control entry heating value, and a second compensation value which decreases a coolant pump RPM, a radiator fan RPM, and an opening command value of a coolant temperature control valve, wherein the feedforward control factor comprises at least one of a pump RPM, a radiator fan RPM, or an opening command value of a coolant temperature control valve, and wherein the changing the target temperature, the feedforward control entry temperature, the feedforward control entry heating value, and the feedforward control factor based on the driver's propensity comprises:

setting an upper limit on the feedforward control factor;

changing the feedforward control factor within the upper limit increasing an output power limit reference temperature margin for changing the target temperature;

setting a lower limit on the target temperature; and changing the target temperature within the target temperature lower limit.

11. The method of claim 10, wherein the driver's propensity is classified into a first group, a second group having a lower defensive driving propensity than the first group, and a third group having a lower defensive driving propensity than the second group, and wherein the changing the target temperature, the feedforward control entry temperature, the feedforward control entry heating value, and the feedforward control factor based on the driver's propensity comprises:

determining a feedforward entry time point in a case that the driver's propensity belongs to the third group to be earlier than a feedforward entry time point in a case that the driver's propensity belongs to the second group; and determining a feedforward entry time point in a case that the driver's propensity belongs to the first group to be later than the feedforward entry time point in the case that the driver's propensity belongs to the second group.

12. The method of claim 11, wherein the changing the target temperature, the feedforward control entry temperature, the feedforward control entry heating value, and the feedforward control factor based on the driver's propensity further comprises determining the target temperature, the feedforward control entry temperature, the feedforward control entry heating value, and the feedforward control factor as the driver propensity control factor in a case that the driver's propensity belongs to the first group.

13. The method of claim 12, wherein the changing the target temperature, the feedforward control entry temperature, the feedforward control entry heating value, and the feedforward control factor based on the driver's propensity further comprises determining values obtained by decreasing the target temperature, the feedforward control entry temperature, and the feedforward control entry heating value by a first reference level and by increasing the feedforward control factor by a second reference level as the driver propensity control factor in a case that the driver's propensity belongs to the second group.

14. The method of claim 13, wherein the changing the target temperature, the feedforward control entry temperature, the feedforward control entry heating value, and the feedforward control factor based on the driver's propensity further comprises determining values obtained by decreasing the target temperature, the feedforward control entry temperature, and the feedforward control entry heating value obtained when the driver's propensity belongs to the second group by a third reference level and by increasing the feedforward control factor obtained when the driver's propensity belongs to the second group by a fourth reference level as the driver propensity control factor in a case that the driver's propensity belongs to the third group.

15. The method of claim 10, further comprising:

calculating a final control factor decision value using the compensation value and the driver propensity control factor.

16. The method of claim 15, wherein the calculating the compensation value comprises calculating a third compensation value, which decreases the target temperature, the feedforward control entry temperature, and the feedforward control entry heating value, and a fourth compensation value which increases the coolant pump RPM, the radiator fan RPM, and the opening command value of the coolant temperature control valve in a case that the driver's propensity is transited to a high defensive driving propensity and the fuel cell heating value change rate is equal to or greater than a second reference value greater than first reference value.

* * * * *